US008545306B2

(12) United States Patent
Yoshikawa et al.

(10) Patent No.: US 8,545,306 B2

(45) Date of Patent: Oct. 1, 2013

(54) GAMING MACHINE DETERMINING THE CONTENT OF BONUS GAME BY ROULETTE

(75) Inventors: Kensaku Yoshikawa, Tokyo (JP); Kenta Kitamura, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 11 days.

(21) Appl. No.: 13/068,861

(22) Filed: Jun. 2, 2011

(65) Prior Publication Data

US 2012/0309487 A1 Dec. 6, 2012

(51) Int. Cl.
*A63F 13/10* (2006.01)

(52) U.S. Cl.
USPC .................................. 463/20; 463/16; 463/29

(58) Field of Classification Search
USPC ...................................................... 463/16–20
See application file for complete search history.

(56) References Cited

U.S. PATENT DOCUMENTS

| | | | | |
|---|---|---|---|---|
| 6,565,436 | B1 * | 5/2003 | Baerlocher | 463/26 |
| 7,131,908 | B2 * | 11/2006 | Baerlocher | 463/20 |
| 7,278,919 | B2 * | 10/2007 | Souza et al. | 463/25 |
| 7,578,736 | B2 | 8/2009 | Baerlocher et al. | |
| 8,100,763 | B2 * | 1/2012 | Collette et al. | 463/25 |
| 2009/0104973 | A1 | 4/2009 | Kato | |
| 2010/0016055 | A1 * | 1/2010 | Englman | 463/20 |
| 2011/0130192 | A1 * | 6/2011 | Englman et al. | 463/20 |
| 2012/0157195 | A1 * | 6/2012 | Sum et al. | 463/29 |

* cited by examiner

*Primary Examiner* — Dmitry Suhol
*Assistant Examiner* — Jay Trent Liddle
(74) *Attorney, Agent, or Firm* — Edwards Wildman Palmer LLP

(57) ABSTRACT

A slot machine 10 executes the processes of: (a1) executing a base game in which the symbols 501 are rearranged on the reel device M1 and a base payout is awarded in accordance with the rearrange symbols 501; (a2) when the symbols 501 are rearranged in the base game so that a predetermined condition is satisfied, displaying, on the upper image display panel 131, the roulette which selects one classification symbol 602 out of the classification symbols 602; and (a3) when one classification symbol 602 is selected out of the classification symbols 602, executing a bonus game which corresponds to the selected classification symbol 602 and is any one of first to fifth bonus games.

3 Claims, 13 Drawing Sheets

GAMING MACHINE DETERMINING THE CONTENT OF BONUS GAME BY ROULETTE

BACKGROUND OF THE INVENTION

1. Field of the Invention

The present invention relates to a gaming machine which determines contents of a bonus game by roulette.

2. Description of Related Art

Conventionally, some gaming machines such as slot machines award a bonus when a predetermined condition is satisfied. For example, there has been known a gaming machine which awards a bonus such as a game medium (e.g., a coin) or a free game when one or more bonus symbols are stopped and displayed.

Such gaming machines awarding a bonus include a gaming machine provided with a plurality of bonuses. For example, Specifications of U.S. Patent Application Publication No. 2009/0104973 and U.S. Pat. No. 7,578,736B2 each discloses a gaming machine in which: one bonus is selected out of a plurality of bonuses in response to a player's operation on an input device such as a button; and the selected bonus is awarded.

On the above-described gaming machine provided with the plurality of bonuses, a player generally plays a game with a great interest in the plurality of bonuses and the selection from the bonuses.

Thus, an object of the present invention is to provide a gaming machine having a new entertainment characteristic by adding a new feature in relation to the selection from the plurality of bonuses.

SUMMARY OF THE INVENTION

The present invention is a gaming machine including: a symbol display device which rearranges a plurality of symbols; a roulette device which has a classification symbol group constituted of a plurality of classification symbols placed, and selects one classification symbol out of the classification symbol group by indicating one area out of areas respectively corresponding to the classification symbols; and a controller which is programmed to execute the following processes of:

(a1) executing a base game in which the symbols are rearranged on the symbol display device and a base payout is awarded in accordance with the rearranged symbols;

(a2) when the symbols are rearranged in the base game so that a predetermined condition is satisfied, causing the roulette device to select one classification symbol out of the classification symbols; and (a3) when one classification symbol is selected out of the classification symbols, executing a bonus game corresponding to the selected classification symbol.

In the above structure, when the symbols are rearranged in the base game so that the predetermined condition is satisfied, one classification symbol is selected out of the plurality of classification symbols by the roulette device. Then, a bonus game corresponding to the selected classification symbol is executed.

Thus, since a process of selecting a bonus game, i.e., which bonus game is to be executed, is shown to a player through the roulette device, it is possible to provide fairness. Further, by producing effects that a bonus game is selected using the roulette device, the entertainment characteristic is improved.

Further, the controller of the present invention may execute, in the process of (a1), the base game on condition that a game value is bet; and, in the process of (a3), execute a free game which is played without betting a game value and has contents corresponding to the selected classification symbol, as the bonus game.

In the above structure, the bonus game is a free game which is played without betting a game value, and therefore the game is more advantageous to the player. This prevents a decrease in the player's motivation to keep playing the game.

Further, in the process of (a3), the controller of the present invention may determine, as for each of the number of free games and a payout scaling factor in the bonus game, whether determination is made based on an input by a player or a predetermined value is used, in accordance with the classification symbol selected by the roulette device.

In the above structure, depending on the selected classification symbol, there is a possibility that the player performs an input operation to determine the number of free games and/or the payout scaling factor in the bonus game when the execution of the bonus game is determined. This prevents the player from being bored.

DETAILED DESCRIPTION OF THE INVENTION

The following describes an embodiment of the present invention, with reference to the drawings.

Figure 1:
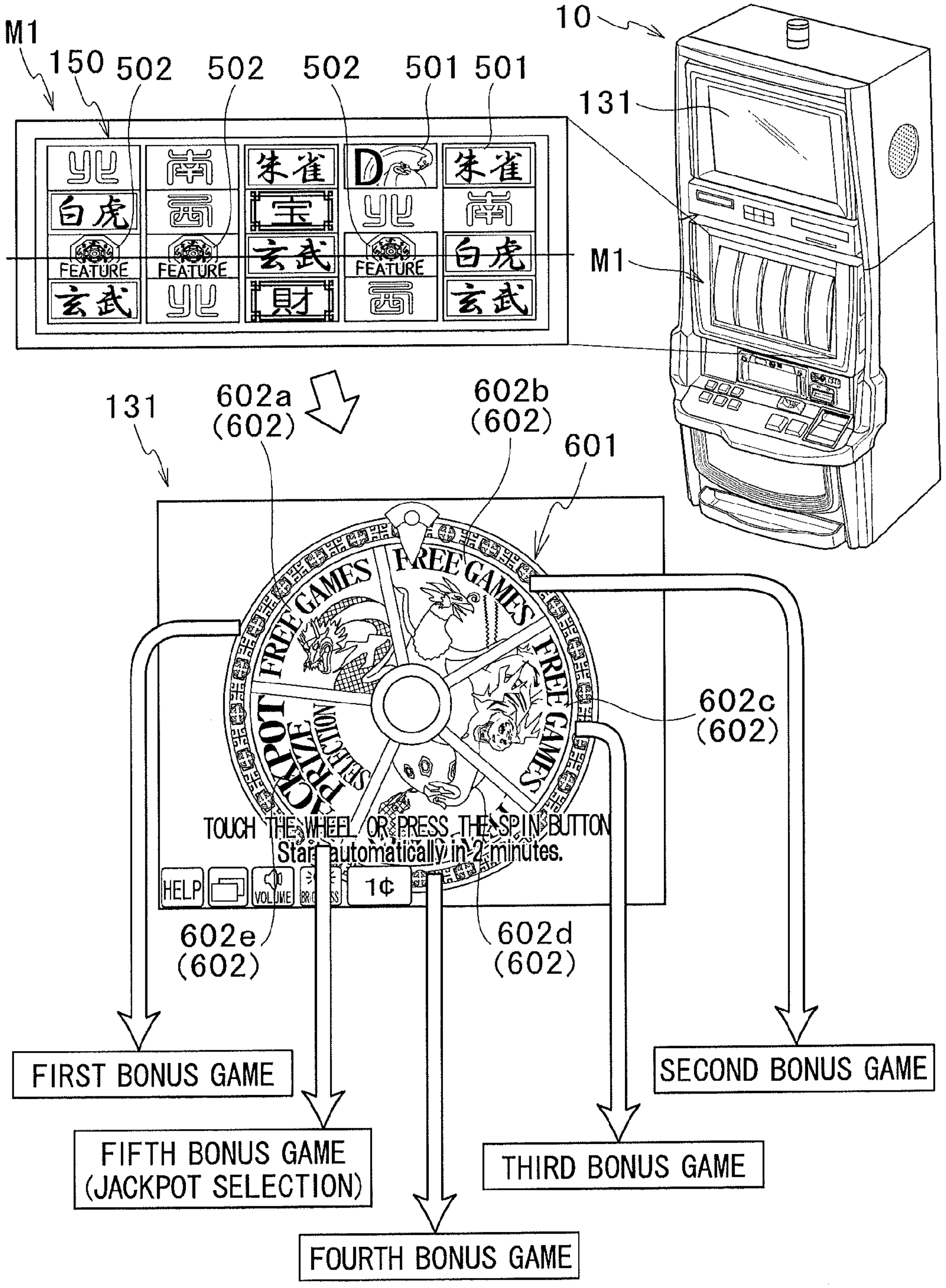
FIG. 1 is a representative drawing illustrating a game state of a slot machine related to an embodiment of the present invention.

As shown in FIG. 1, a gaming machine (slot machine) 10 related to the present invention includes: a reel device M1, acting as a symbol display device, which rearranges a plurality of symbols 501; an upper image display panel 131, functioning as a roulette device, which has a classification symbol group 601 constituted of a plurality of classification symbols 602 placed and selects one classification symbol 602 out of the classification symbol group 601 by indicating one area out of areas respectively corresponding to the classification symbols 602; and a controller 120 which is programmed to execute the following processes of:

(a1) executing a base game in which the symbols 501 are rearranged on the reel device M1 and a base payout is awarded in accordance with the rearranged symbols 501;

(a2) when the symbols 501 are rearranged in the base game so that a predetermined condition is satisfied, causing a function of the roulette device to select one classification symbol 602 out of the classification symbols 602; and (a3) when one classification symbol 602 is selected out of the classification symbols 602, executing a bonus game corresponding to the selected classification symbol 602.

Here, "to rearrange" means to arrange symbols again after arranged symbols are dismissed. In addition, "arranged" means a state where symbols are visually identifiable by a player.

The symbol display device has: a plurality of reels 101, 102, 103, 104, and 105 on which outer circumferential surfaces the plurality of symbols 501 are placed; and a display window 150 which displays the symbols 501 to the outside. That is, the symbol display device is the reel device M1 of a mechanical type, but the present invention is not limited thereto. For example, the symbol display device may be a device of a video-display type, which artificially (virtually) rearranges symbols on a display unit such as a display.

Furthermore, the roulette device is of the video-display type, that is, the classification symbol group 601 constituted of the placed classification symbols 602 is displayed on the upper image display panel 131, but the present invention is not limit to this. For example, the roulette device may be configured so that: the plurality of classification symbols are placed annularly to constitute the classification symbol group and the classification symbol group can be mechanically rotated in a direction of the annular placement and stopped.

Further, the predetermined condition means that of the number of bonus symbols 502, which are special symbols included in the symbols 501, rearranged along a payline is a predetermined number (e.g., three) or more, but the present invention is not limited to this.

Here, the "base game" is a game which is executed on condition that a game value is bet, and provides zero or more amount of game value(s) as a payout in accordance with rearranged symbols 501. In other words, the "base game" is a game started on the premise that a game value is consumed. The "bonus game" has a same meaning as a feature game. In this embodiment, the bonus game is described as a game in which a free game is repeated, or a jackpot selection game in which an amount of jackpot to be paid out is selected. However, the bonus game may be of any types, as long as the bonus game has an advantageous gaming mode compared to the base game. Further, on the premise that an advantageous gaming mode is presented to a player, i.e., its gaming mode is more advantageous than that of the base game, another bonus game may be employed in combination. For example, the bonus game may be realized by one of the following states or a combination thereof: a state where more coins are obtainable than in the base game; a state where a coin is obtainable with higher probability than in the base game, a state where an amount of coins consumed is less than that in the base game, and the like.

In the above structure, since a process of selecting a bonus game, i.e., which bonus game is to be executed, is shown to a player through the roulette device, it is possible to provide fairness. Further, by producing effects that a bonus game is selected using the roulette device, the entertainment characteristic is improved.

Note that, this embodiment describes a slot machine 10 acting as the gaming machine, however, the present invention is not limited to this. For example, the gaming machine may be constructed as a gaming system having a plurality of slot machines and an external controller controlling the slot machines. In this case, the external controller may be a hall server installed in a gaming facility having the slot machines. Such a gaming machine acting as the gaming system may be constructed in one or more gaming facilities such as casinos where various games are played, or may be constructed virtually through the Internet on a server and a PC owned by a player. Further, when the game system is constructed in a single gaming facility, the game system may be constructed in each floor or section of the gaming facility. A communication line may be a wired or wireless line, and can adopt a dedicated line, an exchange line or the like.

(Description on Diagram of Function Flow)

Figure 2:
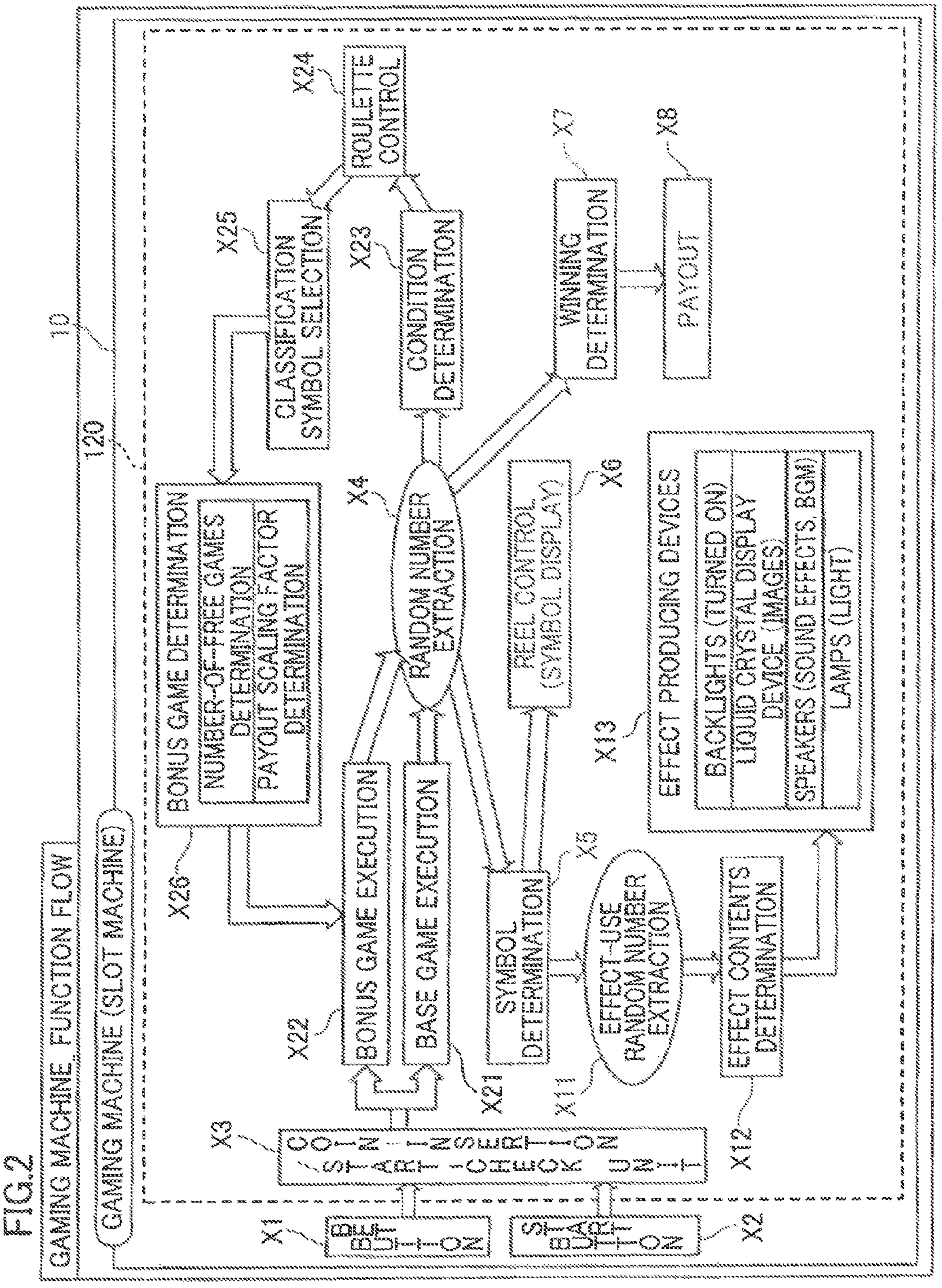
FIG. 2 is a diagram illustrating a function flow of the gaming machine related to the embodiment of the present invention.

With reference to FIG. 2, the following describes functions of the controller 120 of the gaming machine 10 related to the present invention.

(Coin-Insertion/Start-Check)

First, the gaming machine 10 checks whether or not a BET button X1 has been pressed by a player, and then checks whether or not a start button X2 has been pressed by the player (X3).

(Symbol Determination)

Then, when the start button X2 has been pressed by the player, the gaming machine 10 extracts random numbers for symbol determination (X4), for the purpose of use in a base game (X21) or a bonus game (X22), and determines symbols to be displayed to the player at the time of stoppage of the rotation of the reels, for each of the reels (X5).

(Control of Reels)

Next, the gaming machine 10 starts the rotation of each reel and then stops the rotation of each reel so that the determined symbols are displayed to the player (X6).

(Winning Determination)

Then, when the rotation of each reel is stopped, the gaming machine 10 determines whether or not a combination of symbols displayed to the player is a combination related to winning (X7). Note that winning determination may be made anytime after the symbol determination.

(Payout)

Then, when the combination of symbols 501 displayed to the player is the combination related to winning, the gaming machine 10 provides the player with a prize (benefit) in accordance with the type of the combination of symbols (X8). For example, when a combination of symbols related to paying out of coins has been displayed, the gaming machine pays out coins of the number corresponding to the combination of symbols to the player. In this process, coins which have been awarded in a bonus game may be paid out.

(Bonus Game)

The gaming machine 10 determines whether or not a condition for triggering a bonus game (feature game) is satisfied (X23). When the condition for triggering a bonus game is satisfied, the gaming machine 10 controls the roulette device (upper image display panel 131) (X24) to select (to indicate) one classification symbol 602 out of the classification symbol group 601 (X25).

The gaming machine 10 determines contents of a bonus game corresponding to the selected classification symbol 602 (X26). Specifically, the number of free games to be executed in the bonus game, a payout scaling factor, and the like are determined. After the contents of the bonus game have been determined, the bonus game is executed (X22). Note that the bonus game does not have to be repetition of the free game. For example, bonus games may include a game in which: several ranks each having a different amount of prize corresponding thereto are set and one rank is determined out of these ranks. Further, both of these structures may be included in one bonus game.

Although not shown in the drawings, the gaming machine 10 may be structured so that the gaming machine 10 calculates an amount to be accumulated into the amount of jackpot (accumulation amount) every time a game is run and transmits the accumulation amount to an external controller. That is, the external controller may accumulate the accumulation amount transmitted from each gaming machine into the amount of jackpot.

(Determination of Effects)

The gaming machine 10 produces effects by: turning on one or more backlights for symbols provided on the reels; displaying images on a liquid crystal display device; outputting light from lamps; and/or outputting sounds from speakers (X13). The gaming machine extracts an effect-use random number (X11), and determines contents of effects based on symbols determined by lottery, the selected classification symbol 602, or the like (X12).

Thus, the controller 120 of the gaming machine 10 executes each of the above processes. In other words, the controller 120 of the gaming machine 10 has units (function blocks) respectively having functions to execute the above processes. Each function block of the controller 120 may be constituted of hardware, or may be constituted of software if necessary.

Although not shown in the drawings, in the present embodiment, the gaming machine 10 includes: a CPU (Central Processing Unit); an EEPROM (Electrically Erasable and Programmable Read Only Memory) which rewritably stores therein programs executed by the CPU and data used by these programs; a RAM (Random Access Memory) which temporarily stores therein data at the time of execution of a program; and a circuit board such as a motherboard on which these components are mounted. In a storage device such as the above-described ROM, RAM, or the like, a game program and a game system program are stored. The game program includes: a program related to the progress of a game; a lottery program; and a program for producing effects by images or sounds. The storage device stores therein an authentication program, a pre-authentication program, and a program (boot code) for activating the pre-authentication program. The authentication program is a program (falsification check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered. Rewriting of the game program and game system program, the authentication program or the like may be permitted. The storage device is provided with working areas used for operations in execution of these programs. For example, there are provided: an area for storing a counter managing the number of games, a BET amount, a payout amount, a credit amount, or the like; an area for storing symbols determined by lottery; and the like. The function blocks constituting the controller 120 are configured by the above-described hardware in collaboration with software in the storage device.

(Overall Configuration of Slot Machine 10)

Figure 3:
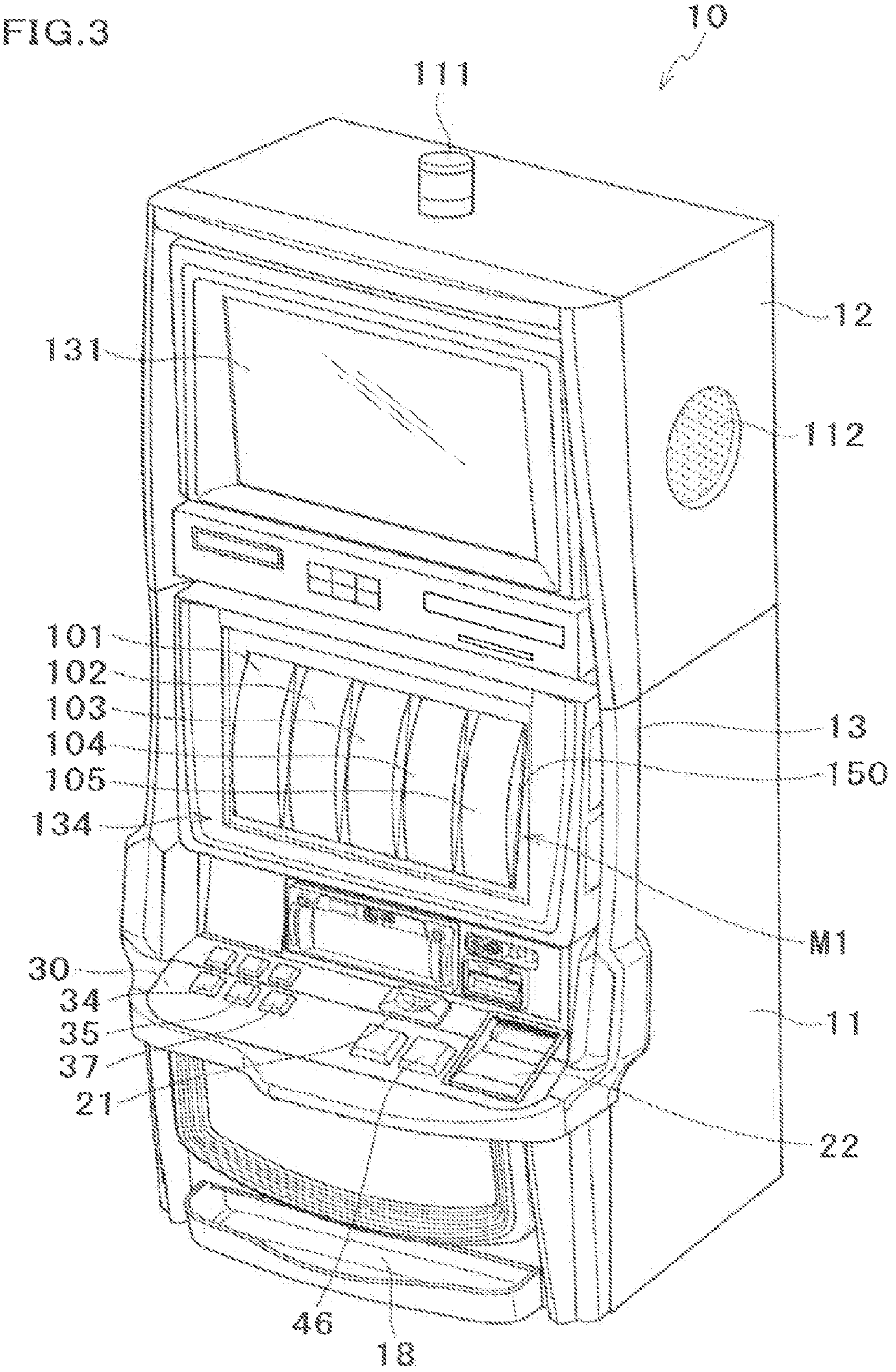
FIG. 3 is a diagram illustrating an overall configuration of the gaming machine related to the embodiment of the present invention.

The following describes overall configuration of the slot machine 10 with reference to FIG. 3.

A coin, a bill, or electrically valuable information corresponding to these is used as a game medium in the slot machine 10. Further, in the present embodiment, a later-described ticket with a barcode is also used. It is to be noted that the game medium is not limited to these, and for example a medal, a token, electric money or the like can be adopted.

The slot machine 10 includes a cabinet 11, a top box 12 installed on the upper side of the cabinet 11, and a main door 13 provided at the front surface of the cabinet 11.

The reel device M1 constituted of five reels 101 to 105 is provided on the main door 13. A reel cover 134 is provided on a front surface of the reel device M1. The reel cover 134 has a transparent liquid crystal panel or a transparent panel. Further, the reel cover 134 may include a touch panel. The reel cover 134 has the display window 150 at its center portion. The display window 150 enables twenty symbols 501 of five columns and four rows to be visually checked from the outside. Fifteen symbols are drawn on the outer circumferential surface of each of the reels 101 to 105. The fifteen symbols are placed successively in a direction of the rotation of the reels 101 to 105, and form a symbol column.

The reel device M1 drives the rotation of the reels 101 to 105, on each of which outer circumferential surface symbols 501 are placed, and then rearranges the symbols 501. In the following description, the reels are referred to as a first reel 101, a second reel 102, a third reel 103, a fourth reel 104, and a fifth reel 105, from the left to the right when viewed from the front.

Although not shown in the drawings, the controller 120 has a motor driving circuit including an FPGA (Field Programmable Gate Array) and a driver. To the motor driving circuit, a stepping motor which rotates the reels 101 to 105 is connected. The FPGA is an electronic circuit such as an LSI which can be designed by programming, and functions as a control circuit for the stepping motor. The driver functions as an amplifying circuit for a pulse inputted into the stepping motor.

The controller 120 also has an index detection circuit. The index detection circuit detects a position of each of the rotating reels 101 to 105, and is capable of detecting a loss of synchronization of the reels 101 to 105.

Furthermore, the controller 120 has a position-change detection circuit. The position-change detection circuit detects a change in a stop position of each of the reels 101 to 105, which change is made after the rotation of the reels 101 to 105 has been stopped. For example, the position-change detection circuit 152 detects a change in the stop position of each of the reels 101 to 105 when the stop position is changed by an external action such as a cheat in order to achieve a combination of symbols 501 related to winning despite the fact that the combination of symbols 501 related to winning is not achieved. The position-change detection circuit 152 is structured so that a change in the stop position of each of the reels 101 to 105 is detected by, for example, sensing fins attached to an internal portion of each of the reels 101 to 105 at predetermined intervals.

An excitation mode of the stepping motor is not particularly limited, and 1-2 phase excitation mode or 2 phase excitation mode can be adopted. Instead of the stepping motor, a DC motor may be used. When a DC motor is used, a deviation counter, a D/A converter, and a servo amplifier are connected to a main body PCB 110 in this order, and the DC motor is connected to the servo amplifier. Further, a rotational position of the DC motor is detected by a rotary encoder, and a current rotational position of the DC motor is supplied in a form of data from the rotary encoder to the deviation counter.

Figure 4:
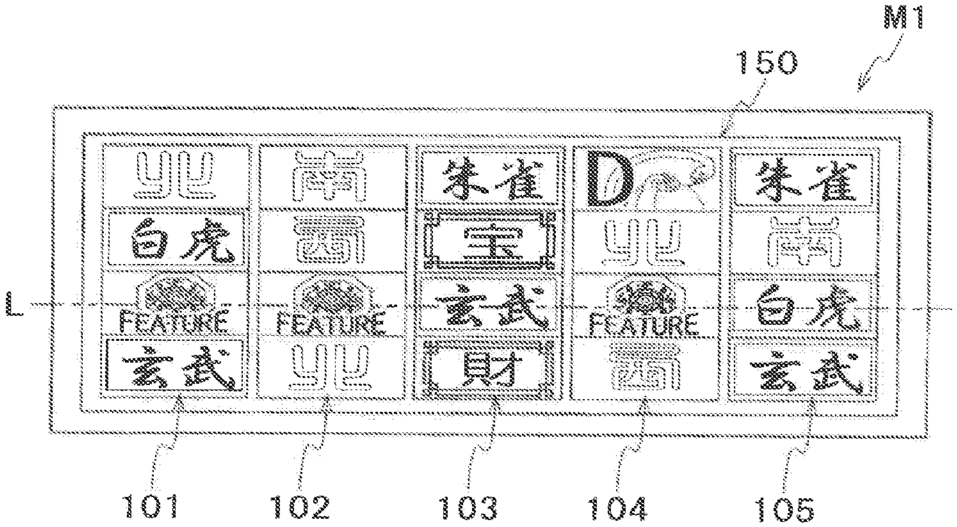
FIG. 4 is a diagram illustrating an example of a mode of a symbol display device of the gaming machine related to the embodiment of the present invention.

As shown in FIG. 4, a payline L is set from a left end to a right end of the display window 150. In an example shown in FIG. 4, one line formed by connecting symbols located in the third row on the respective reels 101 to 105 is used as the payline L with which whether or not a winning is met is determined. Although not shown in the drawings, many paylines (e.g., fifty lines) are set in the same manner, i.e., by connecting symbols on the respective reels 101 to 105, one by one. All of the paylines may be activated regardless of a BET amount, or the number of paylines to be activated may be increased as a BET amount is increased.

A 1-BET button 34 is a button which realizes the following operation: every time the button is pressed, a current credit amount owned by a player is decreased by one for a bet. A 2-BET button 35 is a button used for starting a game under a condition of 2 BET. A 3-BET button 37 is a button used for starting a game under a condition of 3 BET. That is, in the case where the number of paylines to be activated is increased or decreased depending on a BET amount, the 1-BET button 34, the 2-BET button 35, and the 3-BET button 37 each acts as a device for determining a BET amount and simultaneously as a device for determining the number of paylines.

A start button 46 is a button used when scrolling of the reels 101 to 105 is started. The start button 46 also functions as a button for starting a feature game and a button for adding a payout obtained in the feature game to a credit amount. A coin entry 21 accepts a coin into the cabinet 11. A bill entry 22 validates a bill and accepts a valid bill into the cabinet 11.

As shown in FIG. 3, a coin outlet 18 for paying out a coin is provided on a lower front surface of the main door 13, that is, below a control panel 30.

The upper image display panel 131 is provided on a front surface of the top box 12. The upper image display panel 131 includes a liquid crystal panel, and forms a display. The upper image display panel 131 displays images related to effects and images showing introduction of game contents and explanation of game rules. Further, the top box 12 is provided with a speaker 112 and a lamp 111. On the slot machine 10, effects are produced by displaying images, outputting sounds, and outputting lights.

(Placement of Symbols Presented on Reels)

The following describes a structure of symbol columns presented on the respective outer circumferential surfaces of the reels 101 to 105 of the slot machine 10.

Although not shown in the drawings, a symbol column constituted of fifteen symbols 501 is presented on the outer circumferential surface of each of the reels 101 to 105. Each symbol column is constituted of a combination of symbols 501 which are: "seiryu (azure dragon)", "suzaku (vermilion bird)", "byakko (white tiger)", "genbu (black tortoise)", "takara (treasure)", "zai (riches)", "higashi (East)", "minami (South)", "nishi (West)", "kita (North)", "WILD", and "FEATURE" (note: these symbols except "WILD" and "FEATURE" are written in kanji in the drawings, and therefore the reading of each term is described herein with its meaning.) Symbols 501 constituting each symbol column are respectively given code numbers of 00 to 14. Although not shown in the drawings, fifteen number ranges, which are formed by dividing a range for random number extraction (e.g., 0 to 65535) into fifteen sub-ranges, are associated with the code numbers, respectively. For example, for the first reel 101, let us assume that a random number randomly selected falls within a number range corresponding to the code number "00". In this case, the slot machine 10 controls the first reel 101 so that a symbol 501 corresponding to the code number "00" is rearranged at an uppermost stage. That is, symbols 501 which respectively correspond to the code numbers "00", "01", "02", and "03" are rearranged in the display window 150.

Each of a set of wild symbols 503 constituting "WILD" is capable of functioning as any of the symbols 501. Further, in the symbol column of each of the reels 101 to 105, the set of wild symbols 503 are presented on areas corresponding to four symbols. That is, four code numbers are given to the set of wild symbols 503, respectively. For example, let us assumes that in the second reel, four code numbers "00", "01", "02", and "03" are respectively assigned to the set of wild symbols 503 and a random number randomly selected falls within a number range corresponding to the code number "02". In this case, the slot machine 10 controls the second reel 102 so that a symbol 501 corresponding to the code number "02" is rearranged at the uppermost stage. That is, in the display window 150, there are rearranged: wild symbols 503 which respectively correspond to the code numbers "02" and "03"; and symbols 501 which respectively correspond to the code numbers "04" and "05".

(Symbol Combination)

Next, symbol combination will be described. The slot machine 10 stores, in a storage device (such as a later-described ROM 72 or a RAM 73), a symbol combination table in which combinations of symbols 501 related to winning and their payout amount and probability of appearance are specified.

In the slot machine 10, a winning is met when each combination of symbols 501 which are determined to be rearranged in the display window 150 as a result of extraction of a random number, i.e., a combination of symbols 501 rearranged along each payline after the rotation of each of the reels 101 to 105 is sequentially stopped matches any of the combinations of the symbols 501 specified in the symbol combination table. In accordance with the type of combination of symbols 501 for which a winning has been met, a benefit such as paying out of coins or a start of a feature game is given to a player. It is to be noted that a winning is not met (i.e., the game is lost) when the combination of symbols 501 displayed along each payline does not match any of the combinations of symbols 501 specified in the symbol combination table.

For example, when three symbols 501 of the same type are displayed along a payline, winning is met, and a payout is given. Note that, it is not necessary for the symbols 501 of the same type to be rearranged continuously on the reels adjacent to each other. Coins are paid out by: actually discharging coins from the coin outlet 18 or adding a determined amount to a credit amount, or issuing a barcode ticket. The payout scaling factor is determined in accordance with the symbols 501 of the same type rearranged. An amount calculated by multiplying a BET amount by the payout scaling factor is an amount of payout in a base game. When a multiplier is set in a bonus game, the amount of payout is calculated by multiplying a BET amount by the payout scaling factor and the multiplier.

Bonus symbols 502 of "FEATURE" are symbols which trigger a feature game. When three or more bonus symbols 502 are rearranged along a payline in the display window 150, these symbols act as a trigger for the "feature game", and the feature game is started from a next game. That is, three or more bonus symbols 502 rearranged along a payline is a condition for stating a bonus game.

(Game State)

FIG. 4 shows a state in which symbols 501 are rearranged in a base game to satisfy a condition of triggering a bonus game. That is, in the display window 150, three bonus symbols 502 are rearranged along the payline L, and thereby a bonus game is triggered. It should be noted that an event that a bonus game is triggered is also referred to as "FEATURE IN".

Figure 5:
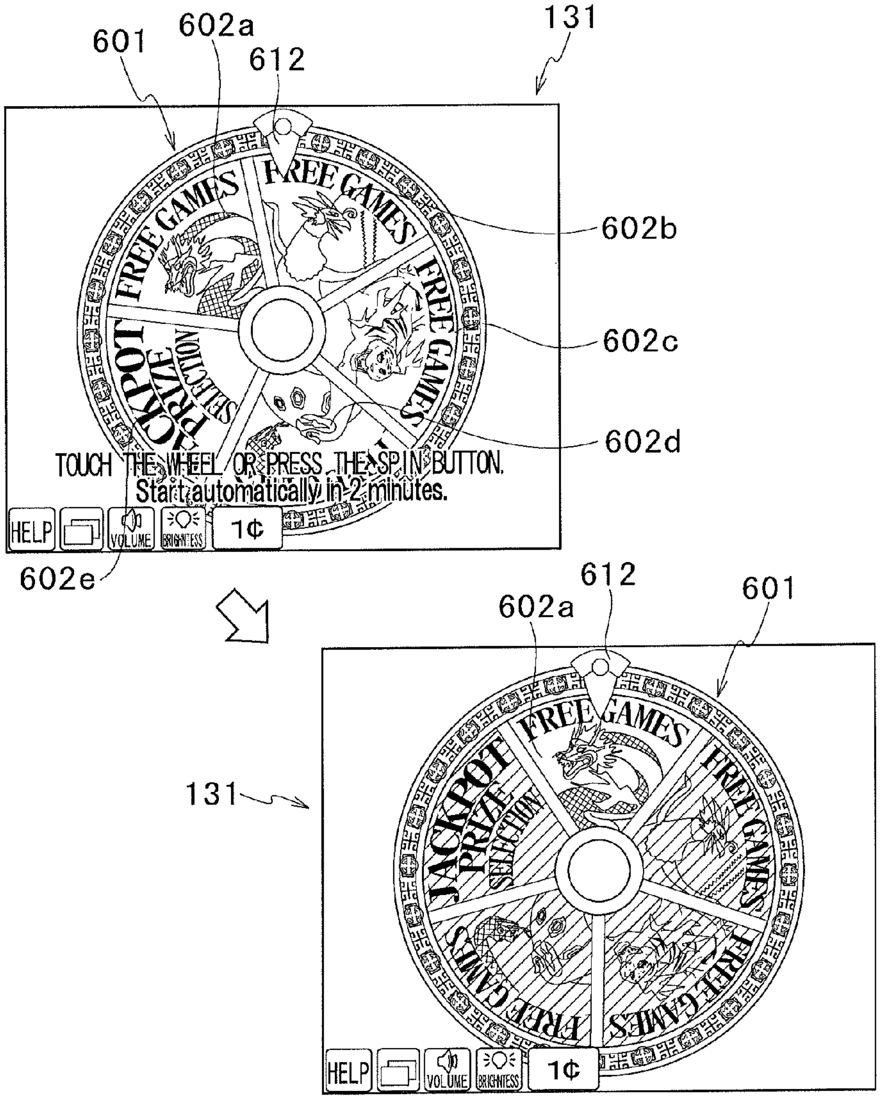
FIG. 5 is an explanatory diagram illustrating a display mode of a roulette device of the gaming machine related to the embodiment of the present invention.

As shown in FIG. 5, when the "FEATURE IN" occurs, a roulette screen is displayed on the upper image display panel 131. On the roulette screen, one classification symbol 602 is selected from the plurality of classification symbols 602, and a bonus game corresponding to the selected classification symbol 602 is determined out of first to fifth bonus games. The first to fifth bonus games respectively correspond to five classification symbols 602*a*, 602*b*, 602*c*, 602*d*, and 602*e*, which are different from one another.

To be more specific, the classification symbol group 601 having the classification symbols 602, and an indication mark 612 are displayed on the roulette screen. The classification symbol group 601 is disposed in a circular area. The area of the classification symbol group 601 is divided into five sub-areas, and the five classification symbols 602*a*, 602*b*, 602*c*, 602*d*, and 602*e* are placed in the five sub-areas, respectively. That is, the five classification symbols 602 are placed annularly. The indication mark 612 is located at an upper portion of the classification symbol group 601, and indicates one of the sub-areas of the five classification symbols 602.

The five classification symbols 602 are displayed in the following manner: the classification symbols 602 are rotated in a direction of the annular placement within the area of the classification symbol group 601, and then stopped. A lower image in FIG. 5 shows a stop mode of the classification symbol group 601. In this image, the classification symbol group 601 is stopped with the classification symbol 602*a* located at the upper portion. That is, the indication mark 612 indicating the classification symbol 602*a* is displayed. The other classification symbols 602*b* to 602*e* are grayed out, which means these symbols are not indicated.

(First Bonus Game)

As shown in FIG. 5, when the classification symbol 602*a* is selected through roulette, execution of the first bonus game is determined. In the first bonus game, the number of free games to be executed and the payout scaling factor are determined based on an input by a player. That is, when the classification symbol 602*a* is selected through roulette, both of the number of free games and the payout scaling factor are determined based on the input by the player. Note that the input may be made through an operation button on the control panel 30, or may be made through a touch panel or the like.

Figure 6:
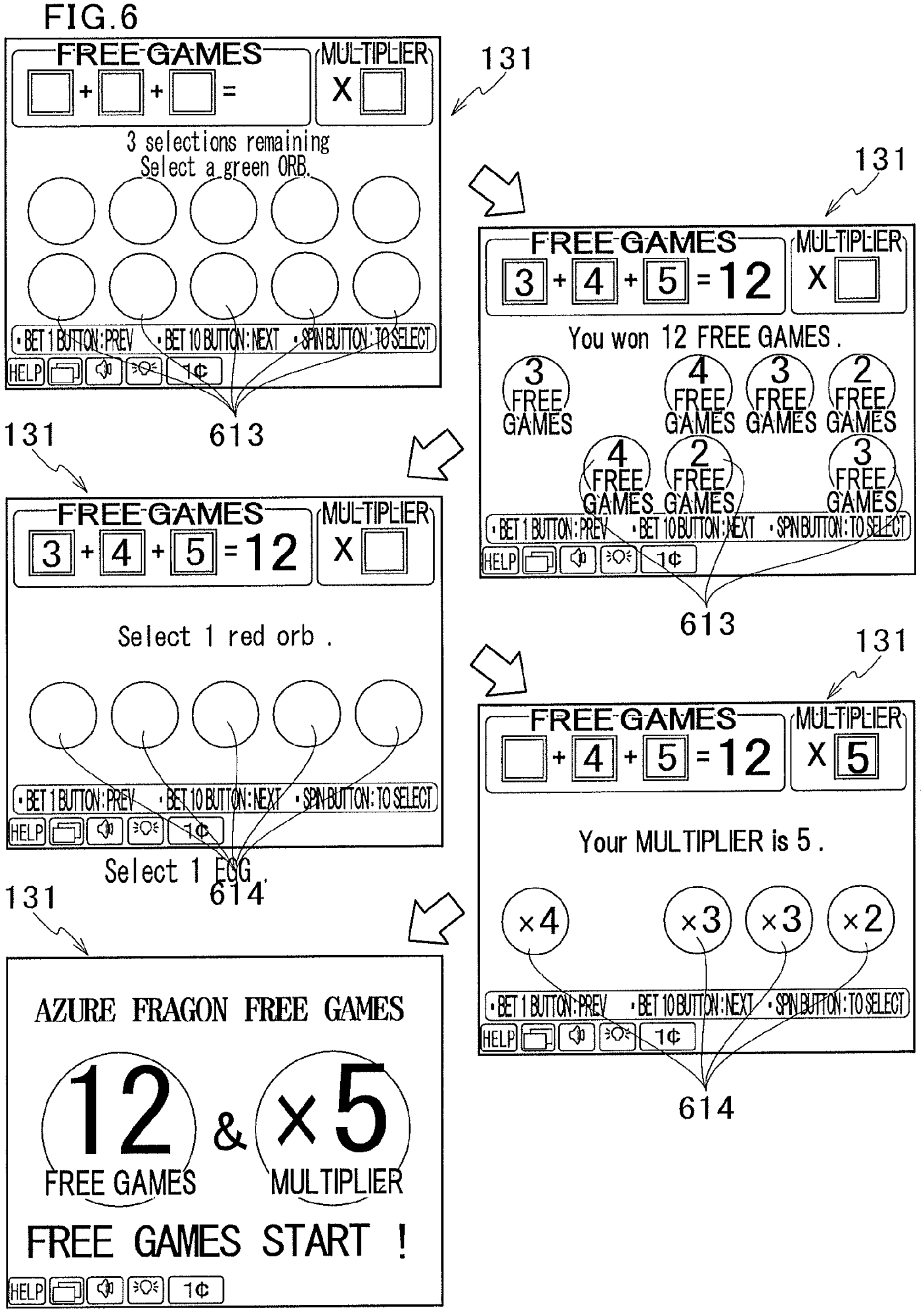
FIG. 6 is an explanatory diagram illustrating a display mode of the roulette device of the gaming machine related to the embodiment of the present invention.

After the classification symbol 602*a* has been selected through roulette, displayed is a screen for determining game contents regarding the number of free games and the payout scaling factor, as shown in FIG. 6. To be more specific, a plurality of (ten) free-game-number selection symbols 613 are placed. Through an input by the player, a predetermined number (three) of the free-game-number selection symbols 613 are selected. With each of the free-game-number selection symbols 613, a numeric value (e.g., any of 2 to 5) is associated, and the total of the numeric values respectively corresponding to the selected free-game-number selection symbols 613 is used as the number of free games. After the player completes the selection, the selected free-game-number selection symbols 613 are hidden. The free-game-number selection symbols 613 which are not selected are displayed with the respective numeric values corresponding thereto.

Then, a plurality of (five) multiplier selection symbols 614 are placed. Through an input by the player, one of the multiplier selection symbols 614 is selected. With each of the multiplier selection symbols 614, a numeric value (e.g., any of 2 to 5) is associated. After the player completes the selection, the selected multiplier selection symbol 614 is hidden. In addition, the multiplier selection symbols 614 which are not selected are displayed with the respective numeric values corresponding thereto.

Note that the numeric value corresponding to the selected multiplier selection symbol 614 is referred to as "multiplier". When a winning is met in a bonus game, a payout scaling factor in a base game is multiplied by the multiplier, to calculate an amount of payout.

(Second Bonus Game)

Figure 7:
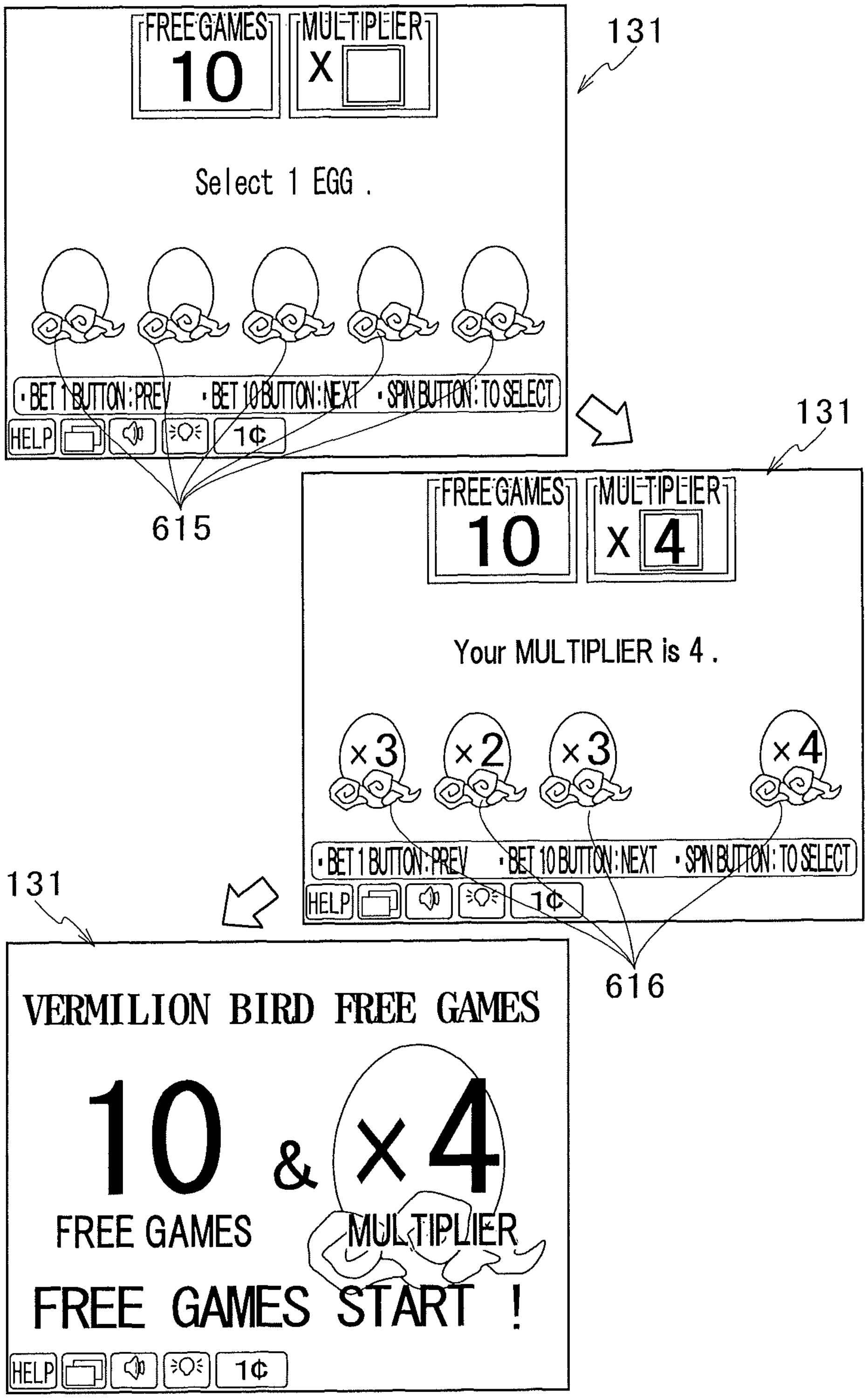
FIG. 7 is an explanatory diagram illustrating a display mode of the roulette device of the gaming machine related to the embodiment of the present invention.

The following describes a case where the classification symbol 602*b* is selected through roulette, and execution of the second bonus game is determined. As shown in FIG. 7, a screen for determining game contents regarding the payout scaling factor is displayed. In the second bonus game, a predetermined numeric value (10) is used as the number of free games, and therefore the player cannot be involved in determination of the number of free games.

To be more specific, a plurality of (five) multiplier selection symbols 615 are placed. Then, through an input by the player, one of the multiplier selection symbols 615 is selected. With each of the multiplier selection symbols 615, a numeric value (e.g., any of 2 to 4) is associated. After the player completes the selection, the selected multiplier selection symbol 615 is hidden. The multiplier selection symbols 615 which are not selected are displayed with the respective numeric values corresponding thereto.

(Third Bonus Game)

The following describes a case where the classification symbol 602*c* is selected through roulette, and execution of the third bonus game is determined. In the third bonus game, predetermined numeric values are respectively used as the number of free games and the multiplier which determines the payout scaling factor (the number of free games: 10, multiplier: 1). Therefore, the player cannot be involved in determination of the number of free games and the payout scaling factor.

Figure 8:
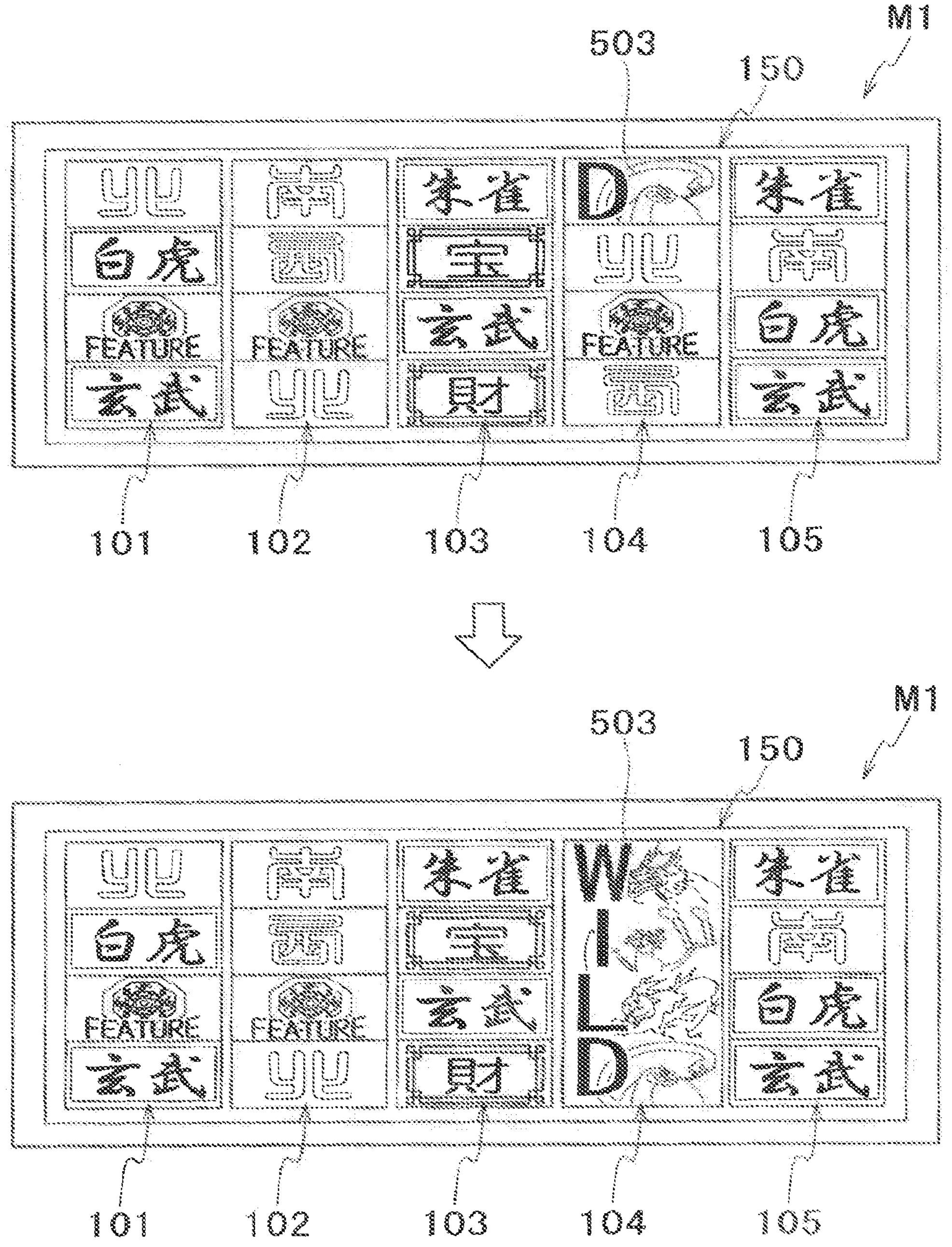
FIG. 8 is a diagram illustrating an example of a mode of the symbol display device of the gaming machine related to the embodiment of the present invention.

As shown in FIG. 8, in the third bonus game, the reels 102 to 105 are controlled so that when one or more wild symbols 503 out of the set of wild symbols 503 which occupy the areas corresponding to four symbols 501 are displayed in the display window 150 in a free game to be executed, all the set of wild symbols 503 are displayed. That is, the reels 102 to 105 are controlled so that when at least one area out of the areas of four code numbers corresponding to the wild symbols 503 is displayed, the areas of four code numbers are displayed.

(Fourth Bonus Game)

The following describes a case where the classification symbol 602*d* is selected through roulette, and execution of the fourth bonus game is determined. In the fourth bonus game, predetermined numeric values are respectively used as the number of free games and the multiplier which determines the payout scaling factor (the number of free games: 7, multiplier: 1). Therefore, the player cannot be involved in determination of the number of free games and the payout scaling factor.

Figure 9:
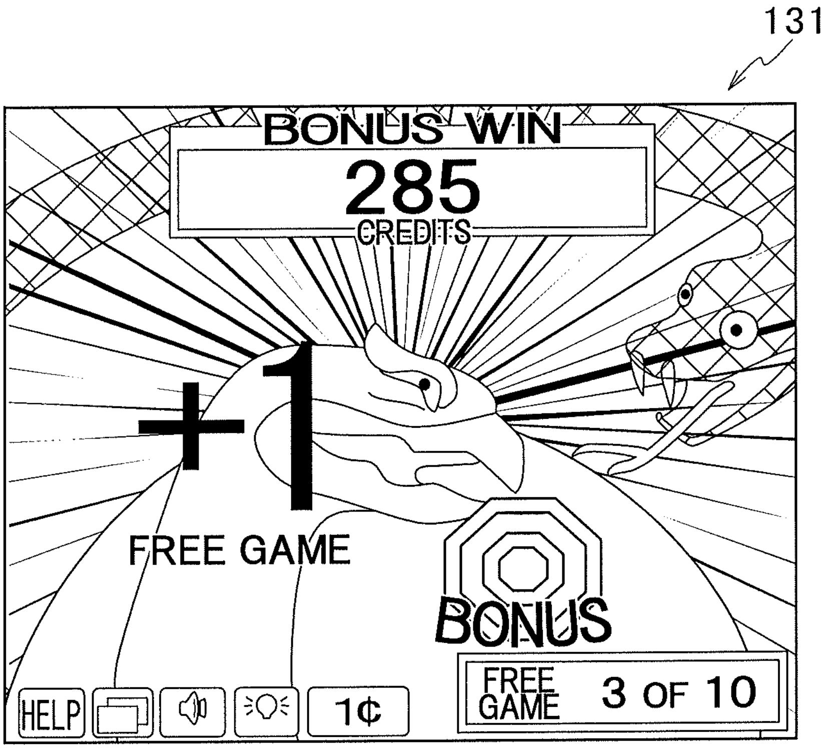
FIG. 9 is an explanatory diagram illustrating a display mode of the roulette device of the gaming machine related to the embodiment of the present invention.

As shown in FIG. 9, in the fourth bonus game, the number of free games is increased when symbols are rearranged so as to satisfy the condition of "FEATURE IN", in a free game to be executed. The number of free games to be increased is determined randomly out of numeric values within a predetermined range (e.g., 1 to 2).

As described above, in the first to fourth bonus games, as for each of the number of free games and the payout scaling factor, whether determination is made based on an input by the player or a predetermined value is used is determined in accordance with the selected classification symbol 602 before a free game is executed.

(Fifth Bonus Game)

Figure 10:
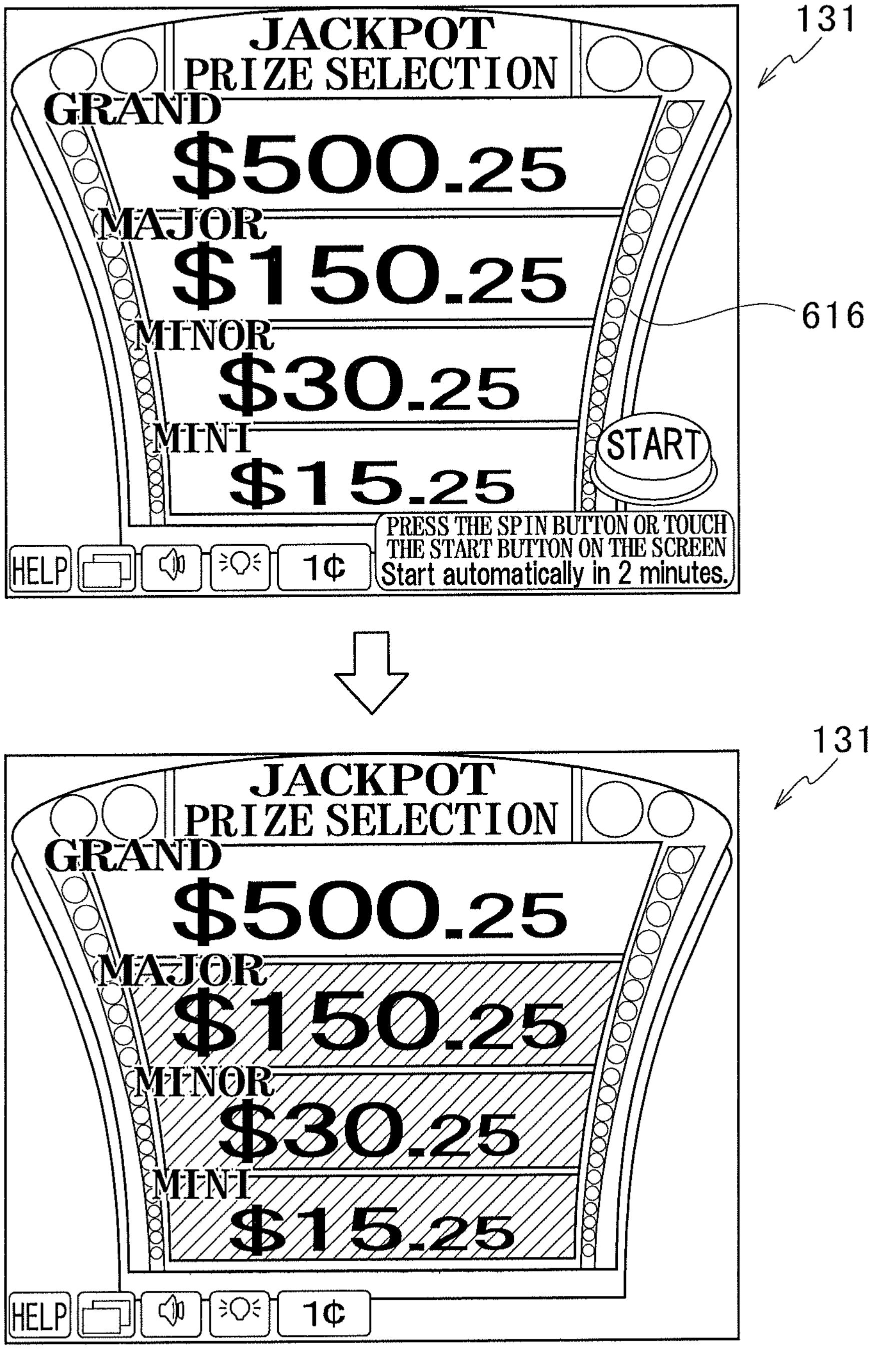
FIG. 10 is an explanatory diagram illustrating a display mode of the roulette device of the gaming machine related to the embodiment of the present invention.

The following describes a case where the classification symbol 602*e* is selected through roulette, and execution of the fifth bonus game is determined. In the fifth bonus game, a free game is not executed, but a payout is awarded from the amount of jackpot. To be more specific, as shown in FIG. 10, a rank determination image 616 is displayed. The rank determination image 616 has four areas, in which the amounts of payout of jackpot ranks of "GRAND", "MAJOR", "MINOR", and "MINI" are indicated, respectively.

One rank is determined out of these ranks, and a payout corresponding to the determined rank is awarded. The areas of the rank determination image 616 are grayed out except the area of the determined rank. Note that the determination of the rank may be made based on an input by the player.

(Programs)

The following describes programs executed by the slot machine 10.

(Main Control Processing)

Figure 11:
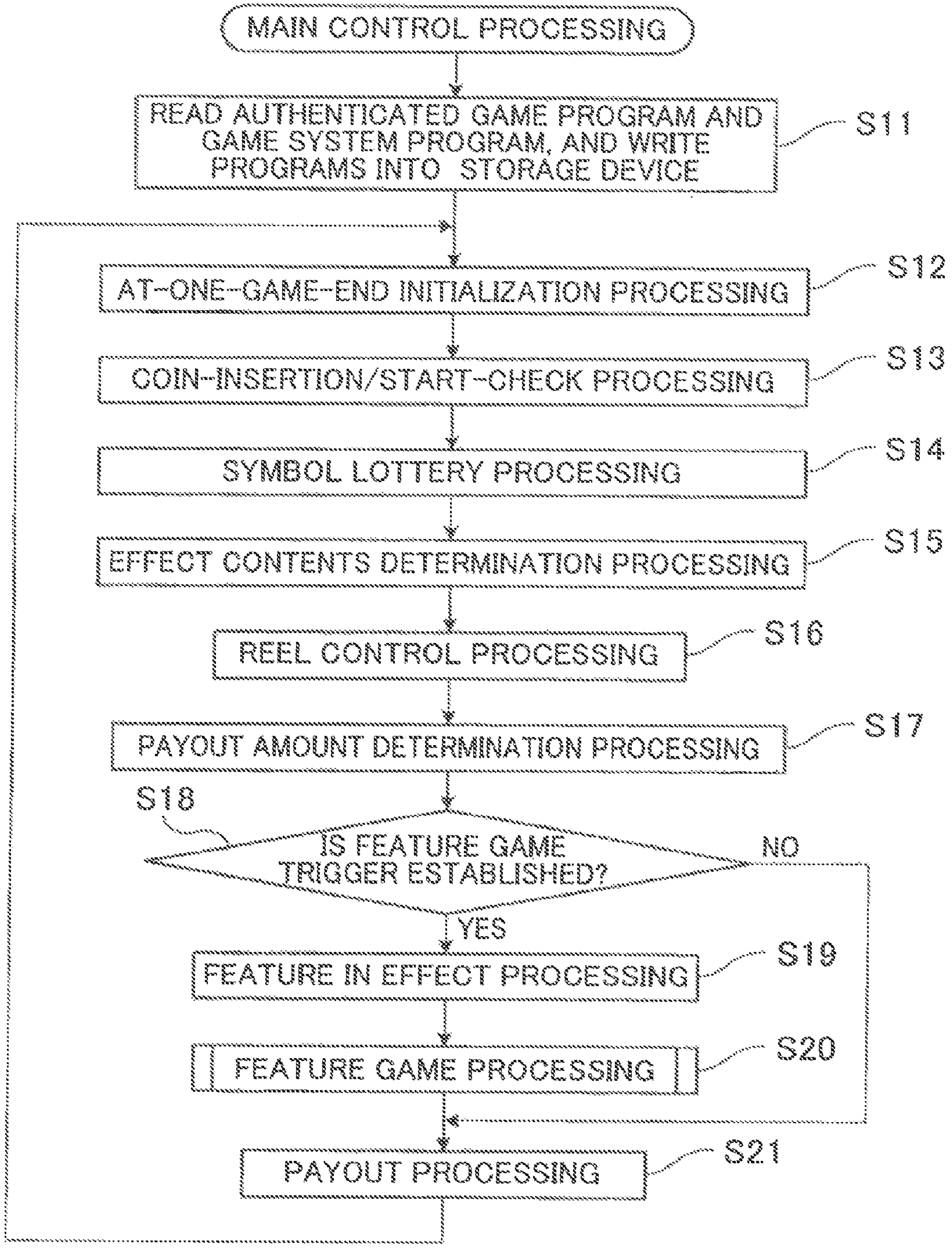
FIG. 11 is a diagram illustrating a flowchart of main control processing of the slot machine related to the embodiment of the present invention.

First, with reference to FIG. 11, main control processing will be described.

First, when power is supplied to the slot machine 10, the controller 120 reads the authenticated game program and game system program, and writes the programs into the storage device (step (hereinafter abbreviated as "S") 11).

Next, the controller 120 conducts at-one-game-end initialization processing (S12). For example, data which becomes unnecessary after each game in the working area of the storage device, such as a BET amount and symbols 501 determined by lottery, are cleared.

Next, the controller 120 conducts coin-insertion/start-check processing (S13). In this processing, an input by a player is checked, for example.

To be more specific, the controller 120 conducts the following processes of: determining whether or not insertion of a coin/bill is detected; incrementing a value of a credit amount counter; permitting reception of the operation of each BET button (34, 35, 37); detecting the operation of each BET button (34, 35, 37); incrementing a value of a BET amount counter and decrementing the value of the credit amount counter based on the operated BET button (34, 35, 37); determining whether or not the BET amount counter has a maximum value, prohibiting update of the value of the BET amount counter when the BET amount counter has the maximum value; permitting reception of the operation of the start button 46 when the BET amount counter does not have the maximum value, detecting the operation of the start button 46; and the like.

The controller 120 then conducts symbol lottery processing (S14). In this processing, to-be stopped symbols are determined based on random numbers for symbol determination.

To be more specific, the controller 120 first extracts random numbers for symbol determination. The controller 120 then determines to-be stopped symbols for the respective reels 101 to 105 by lottery. The controller 120 holds a lottery for each of the reels 101 to 105, and determines any one of the eleven symbols as a to-be stopped symbol.

The controller 120 then stores the determined to-be stopped symbols for the respective reels 101 to 105 into a symbol storage area of the storage device. The controller 120 then references the symbol combination table, and determines whether or not a winning is met with reference to the symbol storage area. The controller 120 determines whether or not a combination of symbols 501 displayed along each payline by the reels 101 to 105 matches any of the combinations of symbols 501 specified in the symbol combination table 191, and determines whether or not a winning is met. After the processing has been conducted, the symbol lottery processing is completed.

The controller 120 then conducts effect contents determination processing (S15). The controller 120 extracts an effect-use random number, and determines one kind of effect contents out of plural kinds of predetermined effect contents, by lottery. For example, in the case where the kinds of the effect contents are linked to the type of symbols, the controller 120 references the to-be stopped symbols for the respective reels 101 to 105, and determines one kind of effect contents out of plural kinds of effect contents linked to the to-be stopped symbols, by lottery.

The controller 120 then conducts reel control processing (S16). In this processing, the reels 101 to 105 are rotated and stopped so that the to-be stopped symbols determined in the symbol lottery processing of S14 are displayed along the paylines.

The controller 120 then conducts payout amount determination processing (S17). In this processing, a payout amount is determined based on the combination of symbols 501 displayed along each payline, and the determined payout amount is stored in a payout amount counter provided in the RAM 73.

The controller 120 then determines whether or not a feature game trigger is established (S18). To be more specific, it is determined whether or not three or more bonus symbols 502 are rearranged along any of the paylines. When the controller 120 determines that the feature game trigger is established (S18: YES), the controller 120 conducts FEATURE IN effect processing (S19) and subsequently conducts feature game processing (S20). The feature game processing will be described later with reference to FIG. 12.

After the processing of S20, or when the controller 120 determines that the feature game trigger is not established in S18 (S18: NO), the controller 120 conducts payout processing (S21). The controller 120 adds a value stored in the payout amount counter to the value of the credit amount counter. Instead, coins corresponding to the value stored in the payout amount counter may be discharged from the coin outlet 18. Alternatively, a ticket with a barcode in which the value stored in the payout amount counter is recorded may be issued. After this processing is conducted, the routine goes to S12.

(Feature Game Processing)

Figure 12:
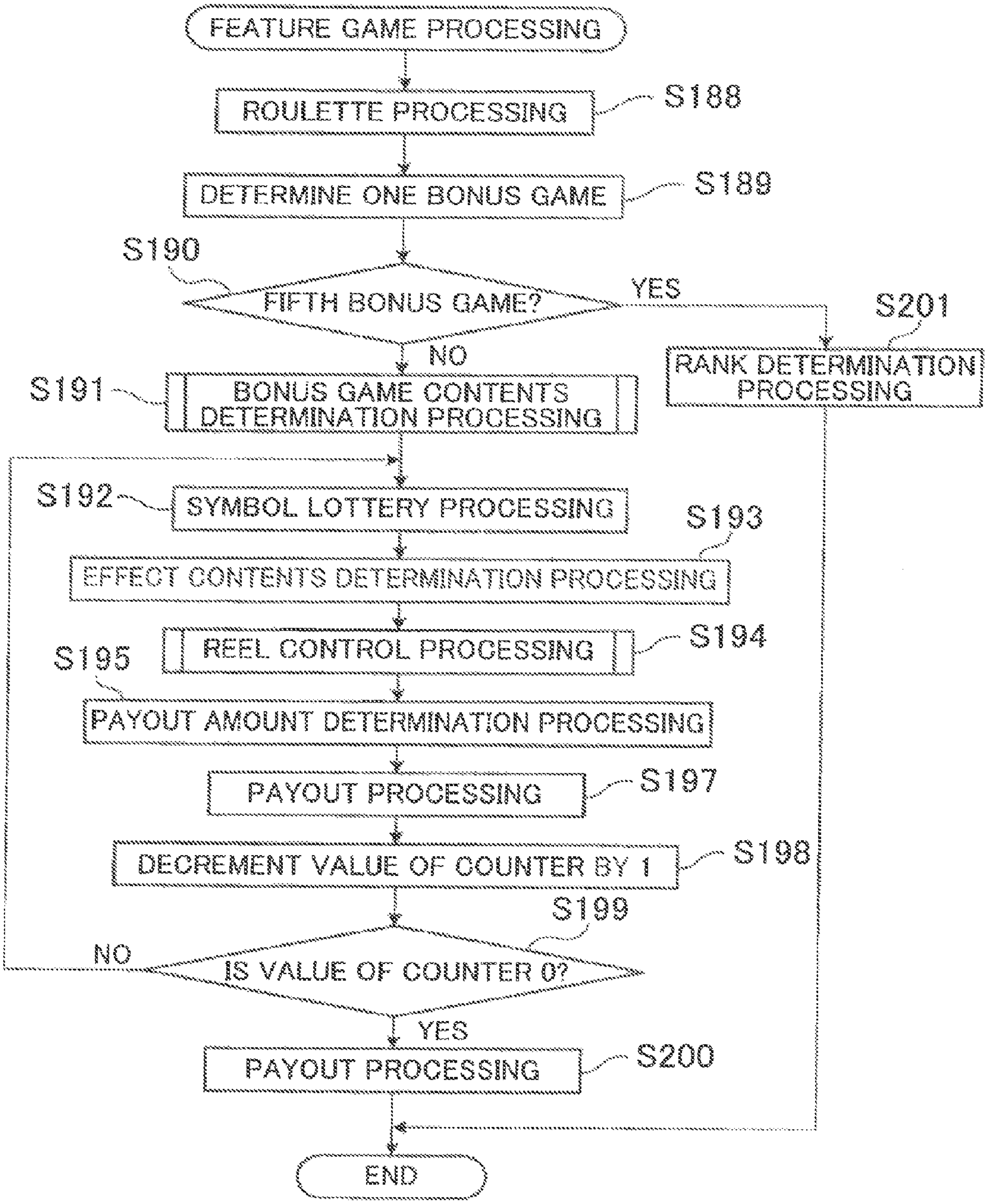
FIG. 12 is a diagram illustrating a flowchart of feature game processing of the slot machine related to the embodiment of the present invention.

Next, with reference to FIG. 12, feature game processing will be described.

Here, with reference to FIG. 12, FEATURE IN effect processing (S19) will be described.

First, the controller 120 conducts roulette processing of indicating one classification symbol 602, as shown in FIG. 5 (S188). To be more specific, through the extraction of a random number, the controller 120 determines a classification symbol 602 to be indicated, and causes the classification symbol group 601 to be rotated and then stopped on the display of the upper image display panel 131 so that the determined classification symbol 602 is displayed at the upper portion of the classification symbol group 601. Then, the controller 120 determines one bonus game out of the first to fifth bonus games, in accordance with the determined classification symbol 602 (S189).

The controller 120 then determines whether or not the determined bonus game is the fifth bonus game (S190). When the determined bonus game is the fifth bonus game (S190: YES), the controller 120 conducts rank determination processing (S201) for determining a jackpot rank, and then the routine goes to S200. On the other hand, when the determined bonus game is not the fifth bonus game (S190: NO), the controller 120 conducts bonus game contents determination processing for determining the number of free games and a multiplier in the bonus game (S191). The bonus game contents determination processing will be described later with reference to FIG. 13.

The controller 120 then conducts the symbol lottery processing which has been explained in S14 (S192). The controller 120 then conducts the effect contents determination processing in the same way as in S15 (S193). The controller 120 then conducts the reel control processing which has been explained in S16 (S194). Although not shown in the drawings, when one or more wild symbols 503 out of the set of wild symbols 503 are rearranged in the display window 150 in the third bonus game, the controller 120 conducts processing of displaying the set of wild symbols 503 on the reel where the one or more wild symbols 503 are rearranged. In addition, when three or more bonus symbols 502 are rearranged along any of the paylines in the fourth bonus game, the controller 120 conducts processing of increasing the number of free games. The controller 120 then conducts the payout amount determination processing which has been explained in S17 (S195).

The controller 120 then conducts the payout processing (S197). In this payout processing, the controller 120 adds a value of the payout amount counter stored in the above-described payout amount determination processing of S195 to a value of a feature game payout amount counter. The feature game payout amount counter manages the total of payout amounts determined during a feature game.

The controller 120 then decrements a value of a counter for the number of free games by one (1) (S198). The controller 120 then determines whether or not the value of the counter for the number of free games is zero (0) (S199). When the controller 120 determines that the value of the counter for the number of free games is not zero (0) (S199: NO), the routine goes to the processing of S192. On the other hand, when the controller 120 determines that the value is zero (0) (S199: YES), or after the processing of S201, the controller 120 adds the value stored in the feature game payout amount counter to the value of the credit amount counter provided in the RAM 73, in the payout processing (S200). That is, the total of payout amounts determined during the feature game is paid out in a lump. Note that, coins may be discharged from the coin outlet 18 or a ticket with a barcode may be issued. Then, the feature game processing is completed.

Figure 13:
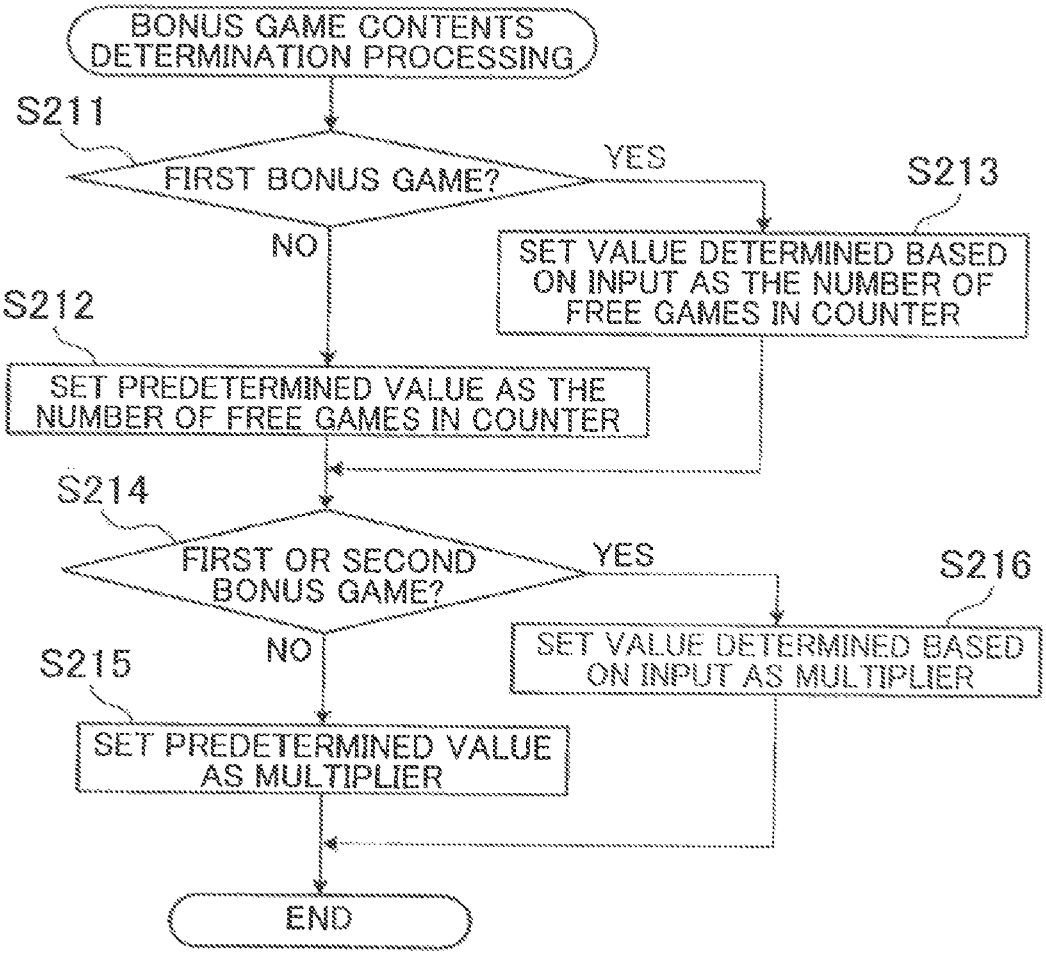
FIG. 13 is a diagram illustrating a flowchart of bonus game contents determination processing of the slot machine related to the embodiment of the present invention.

Next, with reference to FIG. 13, the bonus game contents determination processing (S190) will be described.

First, the controller 120 determines whether or not the determined bonus game is the first bonus game (S211). When the determined bonus game is not the first bonus game (S211: NO), the controller 120 sets a predetermined value as the number of free games in the counter provided in the storage device (S212). The number of free games may differ depending on the type of the bonus game. On the other hand, when the determined bonus game is the first bonus game (S211: YES), the controller 120 determines the number of free games based on an input by the player, as shown in FIG. 6, and sets the determined value in the counter (S213). After the processing of S212 or S213, the routine goes to S214.

The controller 120 then determines whether or not the determined bonus game is the first bonus game or the second bonus game (S214). When the determined bonus game is not the first bonus game or the second bonus game (S214: NO), the controller 120 sets a predetermined value as a multiplier in a counter provided in the storage device (S215). The multiplier may differ depending on the type of the bonus game, or it is possible to adopt a structure such that no particular multiplier is set as same as in the base game (i.e., the multiplier is 1). On the other hand, when the determined bonus game is the first bonus game or the second bonus game (S214: YES), the controller 120 determines the multiplier based on an input by the player as shown in FIGS. 6 and 7, and the determined multiplier (value) is set in the storage device (S216). After the processing of S215 or S216, this routine is completed.

As described above, the controller 120 determines, as for each of the number of free games and the payout scaling factor in the bonus game, whether determination is made based on an input by the player or a predetermined value is used, in accordance with a classification symbol 602 selected by the roulette device.

The embodiment of the present invention, described hereinabove, is solely to serve as an example of the present invention, and is not at all intended to limit the present invention. It is obvious for a person with ordinary skill in the art that the specific structures of the means may be suitably designed and altered as needed. Further, the effects described in the embodiment of the present invention are no more than examples of most preferable effects yielded by the present invention, and the effects of the present invention are not limited to those described in the embodiment of the present invention.

For example, in the above embodiment, the winning determination is made by determining whether or not symbols 501 stopped along each payline constitute a symbol combination of winning. However, the winning determination may be made using one or more scatter symbols, not by using the paylines. Here, the scatter symbol is a symbol used for determining whether or not a winning (awarding a prize, awarding a feature game, or the like) is met, and the winning determination is made by determining whether or not the scatter symbol (a symbol related to winning) is included in fifteen (five columns by three rows) symbols displayed in arrangement areas arrayed in a matrix in the display window 150 when the reels 101 to 105 are stopped. For example, in a game using the scatter symbols, a prize is awarded when a predetermined number of (e.g., five or more) scatter symbols are displayed in the display window 150 (on fifteen arrangement areas). That is, a prize is awarded whenever the predetermined number of scatter symbols are displayed in the display window 150, regardless of their display positions or the manner of placement thereof.

The above structure makes it possible to, each time the rotating reels 101 to 105 are sequentially stopped, turn on a backlight source M70 of a backlight device M7 of each symbol 501 related to winning among a plurality of symbols 501 displayed to the outside through the display window 150, while keeping the backlight source M70 of the backlight device M7 of each of the other symbols 501 which are not related to winning extinguished.

With this, each time the rotation of each of the reels 101 to 105 is stopped, only the symbol 501 which may bring a prize is lighted by the backlight source M70 of the backlight device M7, and therefore it is possible for a player to quickly be aware of and pay attention to only the symbol 501 which may bring a prize, and to enjoy a game with an expectation that symbols 501 to be stopped next may bring a prize.

Further, the detailed description above is mainly focused on characteristics of the present invention to for the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine comprising:

a symbol display device which rearranges a plurality of symbols in a base game;

a roulette device comprising a plurality of classification symbols including classification symbols corresponding to at least a first bonus game type, a second bonus game type, and a third bonus game type, each of the classification symbols corresponding to an area of the roulette device, wherein a classification symbol is selected out of the plurality of classification symbols by indicating the area corresponding to the selected classification symbol;

a storage unit for storing a number of free games and a scaling factor; and, a controller which is programmed to execute the following processes of:

(a1) executing the base game in which the symbols are rearranged on the symbol display device and a base payout is awarded in accordance with the rearranged symbols;

(a2) when the symbols are rearranged in the base game so that a predetermined condition is satisfied, causing the roulette device to select one classification symbol out of the plurality of classification symbols by indicating the area corresponding to the selected classification symbol;

(a3) when one classification symbol is selected out of the classification symbols, determining whether the selected classification symbol corresponds to the first bonus game type;

(a4) when it is determined that the selected classification symbol does not correspond to the first type bonus game type in (a3), storing a predetermined number of free games and a predetermined scaling factor in the storage unit, (a5) when it is determined that the selected classification symbol corresponds to the first bonus game type in (a3), displaying a plurality of player selectable objects having numerical values associated therewith, determining a number of free games and a payout scaling factor based on at least one of the player selectable objects selected, and storing the determined number of free games and the determined scaling factor in the storage unit, (a6) after executing at least one of the processings (a4) and (a5), executing a bonus game type based on the classification symbol selected, wherein if the bonus game type corresponding to the classification symbol selected is one of the first bonus game type, the second bonus game type, and the third bonus game type, executing free games based on the number of free games stored in the storage unit, and awarding a payout based on a result of at least one of the free games and the payout scaling factor stored in the storage unit, and (a7) increasing the number of free games stored in the storage unit based on a result of at least one of the free games executed in the processing (a6) if the bonus game type corresponding to the classification symbol selected is the third bonus game type, wherein, if the bonus game type corresponding to the second bonus game type is selected, the number of free games stored in the storage unit is not increased based on a result of at least one of the free games executed in the processing (a6).

2. The gaming machine according to claim 1, wherein the inputs received by the controller and corresponding to the player selectable objects are selected from among a plurality of player selectable objects, and numerical values associated with each of the plurality of player selectable objects are not displayed until after the inputs are received by the controller.

3. The gaming machine of claim 2, wherein the numerical values corresponding to the player selectable objects that are selected and the player selectable objects that are not selected, are displayed after the inputs are received by the controller.

* * * * *